US012609098B2

(12) United States Patent (10) Patent No.: US 12,609,098 B2
Fadili et al. (45) Date of Patent: Apr. 21, 2026

(54) AUDIO-SIGNAL EQUALISATION DEVICE AND METHOD FOR A VEHICLE USING A DATA COMMUNICATION BUS

(71) Applicant: ARKAMYS, Levallois-Perret (FR)

(72) Inventors: Moulay Fadili, Levallois-Perret (FR); Van Khanh Maï, Levallois-Perret (FR)

(73) Assignee: ARKAMYS, Levallois-Perret (FR)

( * ) Notice: Subject to any disclaimer, the term of this patent is extended or adjusted under 35 U.S.C. 154(b) by 141 days.

(21) Appl. No.: 18/634,252

(22) Filed: Apr. 12, 2024

(65) Prior Publication Data

US 2024/0347031 A1 Oct. 17, 2024

(30) Foreign Application Priority Data

Apr. 14, 2023 (FR) .................................. FR2303775

(51) Int. Cl.
G10K 11/175 (2006.01)
B60R 16/023 (2006.01)
H04R 3/04 (2006.01)

(52) U.S. Cl.
CPC ........... G10K 11/1752 (2020.05); H04R 3/04 (2013.01); B60R 16/023 (2013.01); H04R 2430/01 (2013.01); H04R 2499/13 (2013.01)

(58) Field of Classification Search
CPC ............. G10K 11/175; G10K 11/1754; G10K 11/1752; H04R 3/04; H04R 2430/01; H04R 2499/13; H04R 3/00; H04R 5/04; B60R 16/023; H03G 3/32; H03G 5/025; H03G 5/165; H04S 7/30; G10L 21/0208; G10L 21/0232; H04L 12/40; B60Q 5/00; B60Q 5/008; H04B 1/082

USPC .......................................... 381/73.1, 103, 86
See application file for complete search history.

(56) References Cited

U.S. PATENT DOCUMENTS

| | | | | |
|---|---|---|---|---|
| 9,311,910 B2 * | 4/2016 | Hera | ......................... | B60Q 5/00 |
| 10,497,354 B2 * | 12/2019 | Lee | ....................... | H04R 1/1016 |
| 11,664,005 B2 * | 5/2023 | Yang | ................ | G10K 11/17873 |
| | | | | 381/71.4 |
| 2005/0213776 A1 * | 9/2005 | Honji | ..................... | H03G 5/165 |
| | | | | 381/103 |

(Continued)

FOREIGN PATENT DOCUMENTS

FR 2211921 A1 11/2022

*Primary Examiner* — Xu Mei
(74) *Attorney, Agent, or Firm* — Boone IP Law, PLLC

(57) ABSTRACT

An audio-signal equalisation device for a vehicle using a data communication bus includes a memory storing speed filter data sets comprising triplets associating a speed value and a gain value associated with coefficients for defining a speed masking filter, and functional filter data sets comprising triplets associating an engine or ventilation value and a gain value associated with coefficients for defining an engine or ventilation masking filter. The device further includes a collector receiving parameters accessible on the communication bus and designating the vehicle speed and a functional parameter selected from the vehicle engine speed and a ventilation data set. The device further includes a computer receiving as an input a noise margin value, and the parameters, to derive therefrom a speed filter data set and a functional filter data set and to combine them in a masking equalisation filter to be applied to the audio signal.

19 Claims, 5 Drawing Sheets

(56)　　　　　　References Cited

U.S. PATENT DOCUMENTS

2007/0242837 A1 *  10/2007  Glen ........................ H04R 5/04
                                                       381/101
2020/0314578 A1 *  10/2020  Filos ..................... H04R 3/005

* cited by examiner

AUDIO-SIGNAL EQUALISATION DEVICE AND METHOD FOR A VEHICLE USING A DATA COMMUNICATION BUS

The present disclosure relates to the field of audio-signal processing in a vehicle, and more particularly to the equalisation of such an audio signal in an environment that may be noisy, in particular when the noise in question is liable to vary over time.

The effect of masking a first audio signal by a second audio signal is the process by which the auditory threshold for the first signal is raised by the presence of the second signal. In other words, spectral masking occurs in a given frequency band when the presence of the second signal does not allow detection of the first signal of lower amplitude in the same frequency band.

In a car, this effect is generally created by the aerodynamic noise related to the travelling of the car, as well as by the noise of the engine. In the presence of noise, perception of the spectral balance of the music broadcast in the passenger compartment of the car may then be impaired since some frequencies will be masked.

The tonal balance perceived depends on the difference between the broadcast sound level and the masking threshold. As music signals have a given dynamic range (the difference between the highest amplitudes and the lowest), for a mean level value given in dB SPL (standing for "Sound Pressure Level") close to the threshold, some components of the signal will be perceived and others will be masked.

In order to avoid the masking phenomenon and to preserve the perceived tonal balance, it is necessary to increase some frequencies of the audio signal being broadcast beyond the masking threshold. Since acoustic isolation is not sufficient, techniques for processing the signal have been developed to achieve masking filters for compensating for the masking phenomenon.

In the prior art, two types of technique are conventionally used. A first technique, referred to as SDVC (standing for "Speed Dependent Volume Control") consists in adding a gain calculated from a speed table to increase the sound volume of the audio signal (i.e. the whole of the audio signal) above the masking threshold. A second technique, referred to as SDEC (standing for "Speed Dependent Equalisation Control") consists in applying a low shelf filter the parameters of which are dependent on the speed and the global attenuation of the system.

These two techniques have the advantage of not requiring a great deal of computing power, which is particularly crucial in an automobile environment, both from the point of view of cost and from the point of view of ease of integration.

However, the background noise in a vehicle of the car type with several sources, among which the following can be cited by way of examples:

the configuration of the vehicle itself related to its acoustic insulation, its aerodynamics, the type of tyre and engine, etc;

certain functionalities of the vehicle that may modify the background noise, such as the HVAC (standing for "Heating, Ventilation and Air-Conditioning) system, the activation/deactivation of the heat engine of hybrid cars, etc;

the running noises and the aerodynamic noises, which increase with the speed of the car;

the nature of the surface of the road, asphalt roads or carriageways with large grains being noisier than smooth asphalt roads; and the environment, open country roads being less noisy than tunnels. Rain and wind also increase the background noise in the vehicle.

Background noise can generally be described as a wide-band noise with a decrease of 6 dB per octave in the high frequencies. However, depending on the noise sources listed above, this definition may not be sufficient to describe the masking phenomena encountered in practice. For example, in the presence of rain, the high frequencies may also be masked. Likewise, depending on the nature of the vehicle and the speed thereof, the frequency bands actually masked may change over time.

In the face of such variable masking effects, it may be observed that the SDVC function increases the level of the whole of the signal when the speed increases. However, perception of the audio frequency signal broadcast is not linear around the masking threshold (for example, the high frequencies may be better perceived than the low frequencies). Thus, as the speed increases, the SDVC function increases the level of the whole of the signal whereas this is not necessarily essential for all the frequencies.

For its part, the SDEC function introduces a certain spectral treatment to avoid the above effect. By amplifying the signal with a low shelf filter, the SDEC function guarantees that, for a conventional nose noise profile (i.e. having a decrease of 6 dB per octave in the high frequencies), the low frequencies are increased above the masking threshold and the perceived spectral balance is preserved. The hypothesis is in this case that the background-noise profile depends only on the speed of the vehicle. However, as described above, such a profile may change radically and unpredictably, for example with the surface of the road or the environment.

For this reason, the Applicant has developed equalisation by masking called NDEC (standing for "Noise Dependent EQ Control"), which consists of equalisation control according to the noise captured by an acoustic sensor in the vehicle. This treatment is based on an algorithm that analyses the noise captured by a microphone to deduce therefrom the spectrum of the noise in real time and to apply a compensation filter to the audio signal. It has the great advantage of having great adaptability to the various noises. However, it has numerous disadvantages, such as the need to use a microphone, a very high consumption of computing and memory resources, and the need for dedicated treatment for voice.

Currently, it is therefore necessary to make a selection between equalisation by masking that is simple but not very effective because of the various noise sources, or equalisation that is effective but extremely expensive and complex to implement.

The present disclosure improves the situation. For this purpose, an audio-signal equalisation device for a vehicle is proposed, using a data communication bus comprising:

a memory arranged to store sets of speed filter data comprising triplets associating a speed value and a gain value associated with coefficients for defining a speed masking filter, and functional filter data sets comprising triplets associating an engine speed value or a ventilation value and a gain value associated with coefficients for defining an engine or ventilation masking filter, a collector arranged to receive at least two parameters accessible on the communication bus, said parameters designating the speed of the vehicle and at least one functional parameter selected from the group comprising the engine speed of the vehicle and a ventilation data set, and a computer arranged to receive as an input a noise margin value, as well as said at least two parameters accessible on the communication bus, to derive therefrom at least one speed filter data set and at least one functional filter data set and to combine them in a masking equalisation filter to be applied to the audio signal.

This device is particularly advantageous since it makes it possible to use an equalisation that is effective for the main sources of noise, with an implementation cost that remains reasonable, and which relies on an architecture present in all vehicles, without adding hardware.

Various embodiments according to the present disclosure may have one or more of the following features:

the computer is arranged to determine a speed filter data set and a functional filter data set in the memory from the at least two parameters determined by the collector, to calculate a speed gain value from at least the gain value of the speed filter data set determined and from the noise margin value and to derive therefrom a speed filter data set and to determine a functional gain value from at least the gain value of the functional filter data set determined, from the speed gain value and from the noise margin value, and to derive therefrom a functional filter data set, the computer is arranged to calculate the speed gain value by selecting the minimum between the gain value of the speed filter data set determined and the noise margin value, and to calculate the functional gain value by selecting the minimum between the gain value of the functional filter data set determined and the difference between the noise margin value and the speed gain value, the computer is arranged, in the presence of an engine speed functional parameter and a functional parameter of a ventilation data set, to determine a principal functional filter data set and a second secondary functional filter data set from the engine speed functional parameter and the functional parameter of a ventilation data set, the gain value of the principal functional filter data set being greater than the gain value of the secondary functional filter data set, to determine a first functional gain value from at least the gain value of the principal functional filter data set, from the speed gain value and from the noise margin value and to derive therefrom a first functional filter data set, to determine a second functional gain value from at least the gain value of the secondary functional filter data set, from the first functional gain value, from the speed gain value and from the noise margin value and to derive therefrom a second functional filter data set, and to calculate a functional gain value and a functional filter data set from the first functional gain value, from the second functional gain value, from the first functional filter data set and from the second functional filter data set, the computer is arranged, when the speed parameter is below a selected threshold, to determine a functional filter data set and a speed filter data set in the memory from the at least two parameters determined by the collector, to determine a functional gain value from at least the gain value of the functional filter data set determined and from the noise margin value and to derive therefrom a functional filter data set from the functional gain value, and to determine a speed gain value from at least the gain value of the speed filter data set determined, from the functional gain value and from the noise margin value and to derive therefrom a speed filter data set from the speed gain, the computer is arranged to calculate the functional gain value by selecting the minimum between the gain value of the functional filter data set determined and the noise margin value, and to calculate the speed gain value by selecting the minimum between the gain value of the speed filter data set determined and the difference between the noise margin value and the functional gain value, the computer is arranged, in the presence of an engine speed functional parameter and a functional parameter of a ventilation data set, to determine a principal functional filter data set and a second secondary functional filter data set from the engine speed functional parameter and the functional parameter of a ventilation data set, the gain value of the principal functional filter data set being greater than the gain value of the secondary functional filter data set, to determine a first functional gain value from at least the gain value of the principal functional filter data set and from the noise margin value and to derive therefrom a first functional filter data set, to determine a second functional gain value from at least the gain value of the secondary functional filter data set, from the first functional gain value and from the noise margin value and to derive therefrom a second functional filter data set, and to calculate a functional gain value and a functional filter data set from the first functional gain value, from the second functional gain value, from the first functional filter data set and from the second functional filter data set, and the computer is arranged to apply a high-pass filter to the masking equalisation filter according to the difference between the noise margin, the speed gain value and the functional gain value.

The present disclosure also relates to an audio signal equalisation method for a vehicle using a data communication bus, comprising:

a) storing sets of speed filter data comprising triplets associating a speed value and a gain value associated with coefficients for defining a speed masking filter, and functional filter data sets comprising triplets associating an engine speed value or a ventilation value and a gain value associated with coefficients for defining an engine or ventilation masking filter, b) receiving at least two parameters accessible on the communication bus, said parameters designating the speed of the vehicle and at least one functional parameter selected from the group comprising the engine speed of the vehicle and a ventilation data set, and a noise margin value, and c) deriving, from the parameters of step b) and from the noise margin value, at least one speed filter data set and at least one functional filter data set and to combine them in a masking equalisation filter to be applied to an audio signal.

Various embodiments of the present disclosure may have one or more of the following features:

operation c) comprises c1) determining a speed filter data set and a functional filter data set from the at least two parameters determined by the collector, c2) calculating a speed gain value from at least the gain value of the speed filter data set determined and from the noise margin value and to derive therefrom a speed filter data set, and c3) determining a functional gain value from at least the gain value of the functional filter data set determined, from the speed gain value and from the noise margin value, and to derive therefrom a functional filter data set, operation c2) comprises calculating the speed gain value by selecting the minimum between the gain value of the speed filter data set determined and the noise margin value, and operation c3) comprises calculating the functional gain value by selecting the minimum between the gain value of the functional filter data set determined and the difference between the noise margin value and the speed gain value, when operation b) returns an engine speed functional parameter and a ventilation data set functional parameter, operation c3) comprises c3a) determining a principal functional filter data set and a second secondary functional filter data set from the engine speed functional parameter and the functional parameter of a ventilation data set, the gain value of the principal functional filter data set being greater than the gain value of the secondary functional filter data set, c3b) determining a first functional gain value from at least the gain value of the principal functional filter data set, from the speed gain value and from the noise margin value and deriving therefrom a first functional filter data set, c3c) determining a second functional gain value from at least the gain value of the secondary functional filter data set, from the first functional gain value, from the speed gain value and from the noise margin value and deriving therefrom a second functional filter data set, and c3d) calculating a functional gain value and a functional filter data set from the first functional gain value, from the second functional gain value, from the first functional filter data set and from the second functional filter data set, when the speed parameter from operation b) is below a selected threshold, operation c) comprises c1) determining a functional filter data set and a speed filter data set in the memory from the at least two parameters determined by the collector, c2) determining a functional gain value from at least the gain value of the functional filter data set determined and from the noise margin value and deriving therefrom a functional filter data set from the functional gain value, and c3) determining a speed gain value from at least the gain value of the speed filter data set determined, from the functional gain value and from the noise margin value and deriving therefrom a speed filter data set from the speed gain, operation c1) comprises calculating the functional gain value by selecting the minimum between the gain value of the functional filter data set determined and the noise margin value, and operation c2) comprises calculating the speed gain value by selecting the minimum between the gain value of the speed filter data set determined, the difference between the noise margin value and the functional gain value, when operation b) returns an engine speed functional parameter and a ventilation data set functional parameter, operation c2) comprises c2a) determining a principal functional filter data set and a secondary functional filter data set from the engine speed functional parameter and the functional parameter of a ventilation data set, the gain value of the principal functional filter data set being greater than the gain value of the secondary functional filter data set, c2b) determining a first functional gain value from at least the gain value of the principal functional filter data set and from the noise margin value and deriving therefrom a first functional filter data set, c2c) determining a second functional gain value from at least the gain value of the secondary functional filter data set, from the first functional gain value and from the noise margin value and deriving therefrom a second functional filter data set, and c2d) calculating a functional gain value and a functional filter data set from the first functional gain value, from the second functional gain value, from the first functional filter data set and from the second functional filter data set, and the method furthermore comprising the operation d) of applying a high-pass filter to the masking equalisation function according to the difference between the noise margin, the speed gain value and the functional gain value.

The present disclosure also relates to a computer program comprising instructions for executing the method according to the present disclosure, a data storage medium on which such a computer program is recorded and a computer system comprising a processor coupled to a memory (e.g., a non-transitory computer-readable medium), the memory having recorded such a computer program.

BRIEF DESCRIPTION OF THE DRAWINGS

Other features and advantages of the present disclosure will appear better upon reading the following description, with reference to examples given for illustrative and non-limiting purposes, with reference to the drawings wherein.

The drawings and the description hereinafter essentially contain elements of certain nature. Hence, they can not only serve to better understand the present disclosure, but also contribute to the definition thereof, where appropriate.

DETAILED DESCRIPTION

The present description is of such a nature as to involve elements capable of protection by copyright. The holder of the rights has no objection to identical reproduction by anyone of the present patent document or of the description thereof, as it appears in the official dossiers. For the remainder, he fully reserves his rights.

Figure 1:
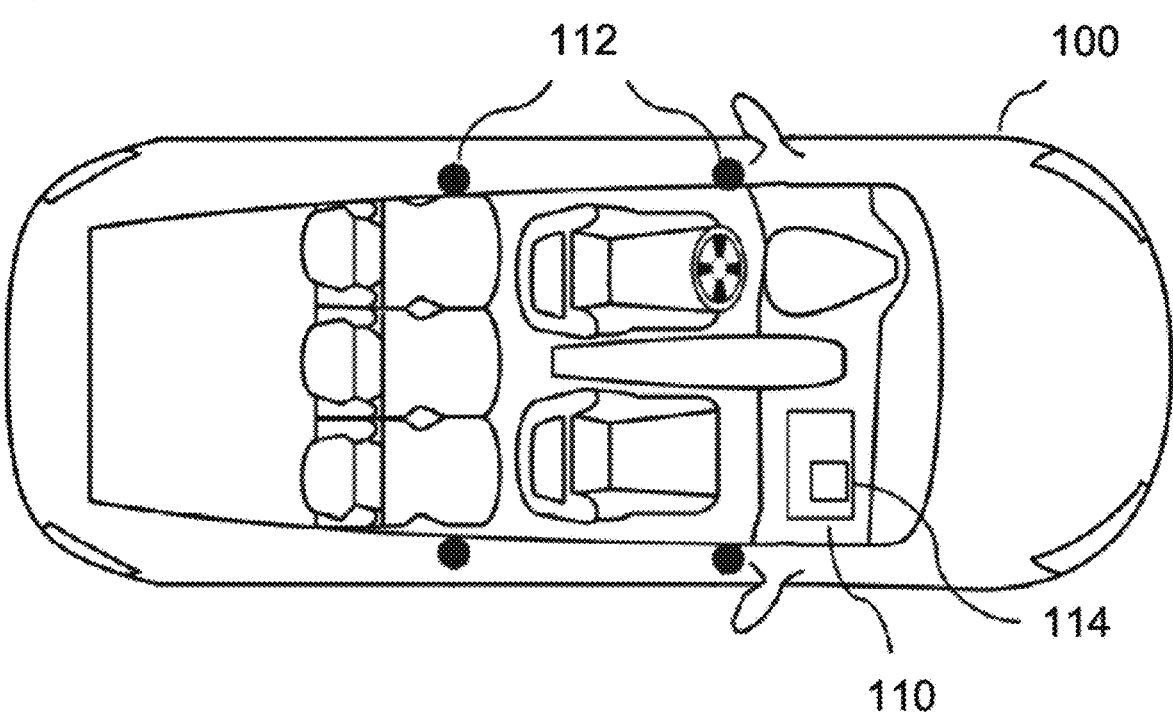
FIG. 1 shows a system for broadcasting an audio signal in a vehicle implementing the present disclosure.

FIG. 1 shows a system 110 for broadcasting an audio signal implemented using the present disclosure in a broadcasting environment that takes the form of a vehicle 100.

The vehicle is here shown in the form of a car, but the present disclosure applies to any type of motor vehicle. As will be clear below, the present disclosure is based particularly on the fact that the vehicle 100 uses a data communication bus as a CAN bus.

Figure 2:
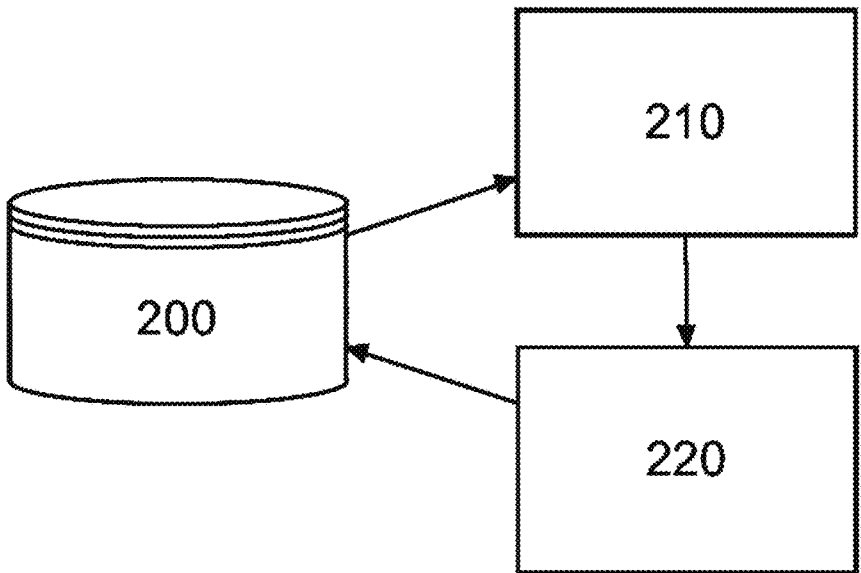
FIG. 2 shows an example of a structure of a device for using equalisation by masking in the system of FIG. 1, for implementing the present disclosure.

The broadcasting system 110 comprises a plurality of loudspeakers 112 and an equalisation device 114 according to the present disclosure. The equalisation device 114 is configured to implement equalisation by masking according to any one of the embodiments described with FIG. 3 or FIG. 7. FIG. 2 shows a schematic example of the use of the device 114.

In various embodiments, the equalisation device 114 is not integrated in the broadcasting system 110 but is connected thereto via a wire connection (example a USB connection or equivalent) or wireless connection (for example a Bluetooth, Wi-Fi or equivalent connection) in order to exchange the data, such as the broadcast audio signal and the equalised audio signal. The broadcasting system 110 may comprise a single loudspeaker 112.

FIG. 2 shows a schematic example of use of the equalisation device 114. In the example described here, the equalisation device 114 comprises a memory 200, a collector 210 and a computer 220.

The memory 200 may be any type of data storage able to receive digital data: hard disk, hard disk with flash memory, flash memory in any form, random access memory, magnetic disc, storage distributed locally or in the cloud, etc. Nevertheless, because of the automobile application of the present disclosure, the memory 200 will more probably be a flash memory or a hard disk to which the system 110, the collector 210 and the computer 220 can gain access.

In the example described herein, the memory 200 receives all the data regarding the device 114, i.e. the programs and software instantiating the collector 210 and the computer 220, the parameters thereof, the data received as an input (where applicable), the intermediate filter gain and coefficient values, the data stored in a buffer and the masking filter data output. The data calculated by the device may be stored on any type of memory similar to the memory 200, or on the latter. These data may be erased after the device has performed its tasks or kept.

The memory 200 receives sets of speed filter data comprising triplets associating a speed value, a gain value and speed masking filter coefficients, and functional filter data sets comprising triplets associating an engine speed value or a ventilation value, a gain value and engine or ventilation masking filter coefficients. The sets of coefficients make it possible to implement the various filters quickly and at low cost. The sets of coefficients may be generic or be specifically adapted to each vehicle. In the context of the present disclosure, the latter option is preferred. In the examples described here, the masking filters used are biquadratic filters. In a variant, these filters could be another type such as recursive filters or finite impulse response filters implemented in the time domain. These filters can also be implemented in the frequency domain.

The memory 200 receives parameters as input data, as well as one or more noise margin data.

The parameters serve to define the characteristics of the masking noise phenomena that the device 114 aims to filter. These parameters are obtained by the collector 210 from a communication bus of the vehicle, for example the CAN bus. This embodiment is particularly advantageous since the CAN bus circulates numerous items of information that make it possible to qualify the state of the vehicle, whether this be its speed, its engine speed or other functional information such as the parameters of the HVAC system (for example and non-limitatively, an operating indicator, a ventilation speed value and a ventilation power value). Hereinafter, the speed represents a speed parameter, while the engine speed and the parameters of the HVAC system represent a functional parameter. The reason for this distinction is that the speed represents a fairly known source of noise, both through the road surface and the aerodynamics and travelling of the vehicle, and the masking filter that is associated therewith is fairly known. On the other hand, the filtering of the masking of the noises related to the engine and to the HVAC system is poorly controlled since it is wished to calculate it at reasonable cost. It is for this reason that the SDEC method for example does not process them.

The Applicant realised with surprise that, against all expectations, the CAN provides all the essential data for defining functional noises such as the engine noise or the HVAC noise, which makes it possible to supplement the SDEC filtering. As will be seen below, this distinction between various sources and their characterisation allows differentiated treatment that approximates the performance of NDEC, but at much lower cost and with very great versatility of vehicle platforms, without a micro being necessary. This simplicity that relies on the pre-existing CAN (or other communication bus) moreover simplifies integration of the device 114 in the vehicle.

Thus, in order to save on computing costs, the speed ranges, engine speed and HVAC system data are made discrete to associate with each a filter gain and filter coefficients stored in the memory 200. Thus, each triplet associating a speed value (and respectively engine speed or HVAC system data), a gain and a set of filter coefficients defines a speed filter data set (and respectively engine or ventilation data set). These filter data sets are manipulated by the computer 220 to calculate the masking equalisation filter. Preferably, the filter data sets are personalised for each vehicle family and are adjusted prior to the use of the device 114.

The noise margin data can be of two natures: firstly attenuation, related to the sound volume required for the audio signal, and a maximum gain required for the device 114. Hereinafter, the noise margin will represent the smaller of these two values. In a variant, only one of these two values can be considered, in which case the noise margin is either equal to the attenuation or equal to the maximum gain required, according to the case provided.

The collector 210 and the computer 220 access the memory 200 directly or indirectly. They could be made in the form of an appropriate computer code executed on one or more processor(s). By processors, it should be understood any processor suited to the calculations described hereinbelow. Such a processor may be made in any known manner, in the form of a microprocessor for a personal computer, laptop, tablet or smartphone, an FPGA or SoC type dedicated chip, a computing resource on a grid or in the cloud, a cluster of graphical processors (GPUs), a microcontroller, or any other form capable of providing the computing power necessary to the completion of the process described hereinbelow. One or more of these elements may also be made in the form of specialised electronic circuits such as an ASIC. A combination of a processor and of electronic circuits may also be considered. Because of the automobile context of the present disclosure, the simplest processors possible will be preferred in order to optimise the cost of the device 114.

It will become clear moreover that the only function of the collector 210 is recovering the parameters and the noise margin to operate the computer 220. In a variant, the collector 210 and the computer 220 could be merged, or on the contrary the computer 220 could be exploded into smaller units, provided that functionally the operation of the device 114 does not change.

Figure 3:
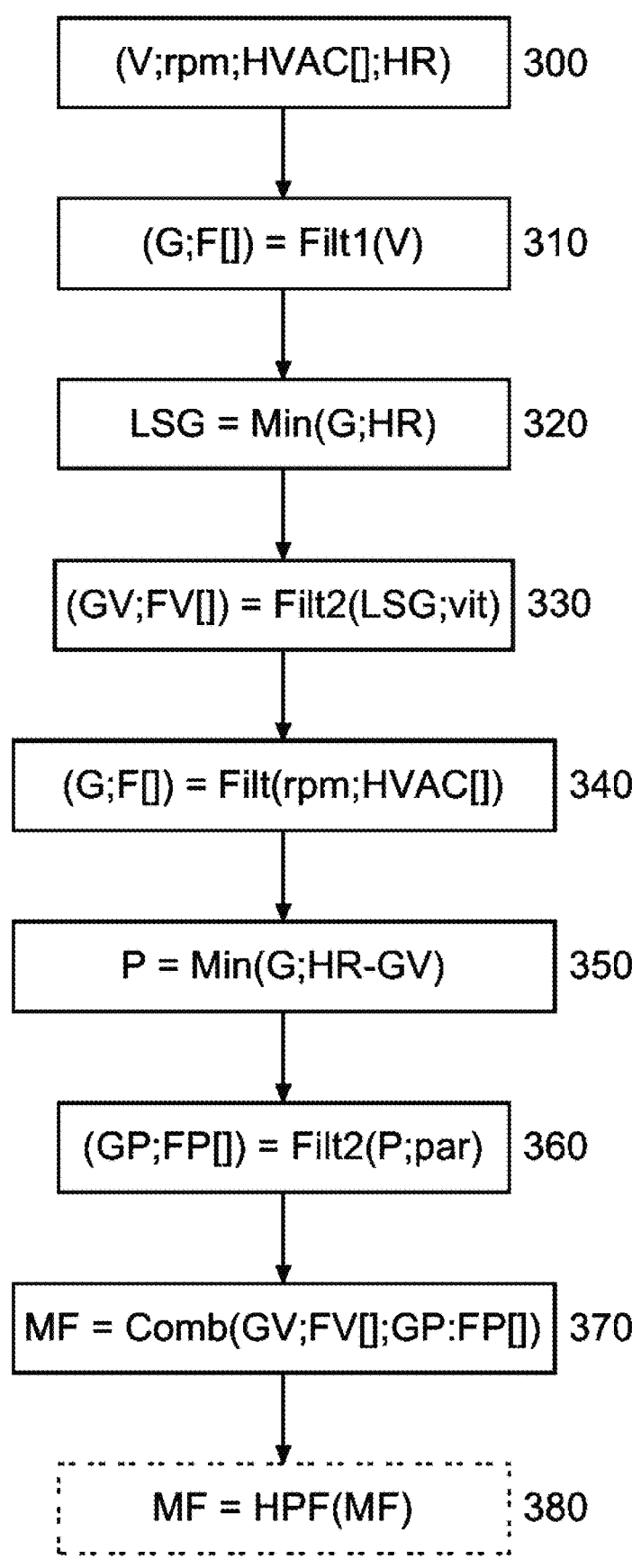
FIG. 3 shows a first embodiment of equalisation by the device of FIG. 2.

FIG. 3 shows a first embodiment of masking equalisation implemented by the device of FIG. 2. In this embodiment, it is considered that the speed is the greatest noise source. For this reason, processing thereof is prioritised. Next, the noise associated with the functional parameter is processed, and this processing depends, as will be seen, on the processing of the speed noise. In the example shown on FIG. 3, only one functional parameter is considered to be present. In a variant, it would be possible to process several functional parameters, for example in the manner described with the second masking equalisation implementation.

In an operation 300, the collector 210 recovers from the CAN bus the data necessary for the processing by the computer 220, i.e. the speed of the vehicle V (speed parameter), one from the engine speed rpm and the ventilation data HVAC[ ]), and the noise margin HR. The speed V, the engine speed rpm and the ventilation data HVAC[ ] can be obtained through any data travelling over the CAN (or other communication bus of the vehicle), directly or indirectly.

Next the speed noise is processed in operations 310, 320 and 330. In the operation 310, the computer 220 calls the memory 200 in order to recover the speed filter data set that corresponds to the speed V by means of a function Filt1( ) that receives the speed V as argument. If the value of the speed V is not present in the speed filter data sets present in the memory 200, the function Filt1( ) can return the speed filter data set the speed of which is closest to the speed V or a speed filter data set derived from an interpolation of one or more speed filter data sets. Next, in the operation 320, a gain LSG is determined by means of a function Min( ). The role of the function Min( ) is to take account, in the processing by the computer 220, of the fact that the noise margin (or "headroom") is finite: it is not possible to apply just any correction to the audio signal according to the volume thereof. In addition, if the audio signal played is very strong, beyond the risks of saturation of the loudspeakers 112, it can be considered to be unnecessary to amplify the signal to filter the masking. Thus, in the example described here, the function Min( ) adopts the lowest value between the gain value of the speed filter data set of the operation 310 and the noise margin. Finally, in the operation 330, if the operation 320 has generated a gain LSG different from the gain of the operation 310, a function Filt2( ) is executed in the operation 330 to determine the speed filter data set in the memory 200 the gain of which best corresponds to the gain LSG. There also, the function Filt2( ) can return the speed filter data set the gain GV of which is closest to the gain LSG, or a speed filter data set derived from an interpolation of one or more speed filter data sets.

After the operations 310 to 330, the computer 220 implements operations 340 to 360 to process the noise associated with the functional parameter. As mentioned above, the embodiment in FIG. 3 processes only a single functional parameter, whether it be the engine speed or ventilation data. The operation 340 is similar to the operation 310 and implements the function Filt1( ) with the functional parameter considered for determining the functional filter data set that is closest to it in the memory 200. Next, in the operation 350, a gain P is calculated to take account of the noise margin, in a similar manner to the operation 320. However, to take account of the processing of the operations 310 to 340, it is not the noise margin that is compared with the gain of the functional filter data set of the operation 340, but the amputated noise margin of the speed gain GV of the operation 330. Finally, in the operation 360, the functional filter data set of the operation 340 is reprocessed according to the functional gain P determined at the operation 350, and the functional filter data set FP[ ] is returned.

Finally, in an operation 370, the computer 220 executes a function Comb( ) that combines the speed gain GV and the speed filter data set FV[ ] of the operation 330 with functional gain GP and the functional filter data set FP[ ] of the operation 360 to calculate the masking equalisation filter MF.

In a preferred embodiment, the masking equalisation filter MF is refined in an optional operation 380 by means of a high-pass filter in order to protect the loudspeakers 112 against excessive gain in the low frequencies.

It is clear that the operations 310 and 340 can be implemented in parallel. The following operations 350 on the other hand are dependent on the operations 320 and 330.

It is therefore clear that, by successive keys, the masking equalisation filter is constructed while taking account of the noise margin available. In order to further reduce the costs of the present disclosure, the calculations of the coefficients of the filters can be done by storing filter data sets of the all-pass type that are modified according to the gain determined at certain steps. For example, the filter data set of the operation 360 can be determined from the following operations:

gainLin=Transformation of the functional gain value (in dB) in linear gain in accordance with the formula gainLin=10^(P/20):

$$b0 = 0.5 * ((1 + gainLin) + b0\_ap * (1 - gainLin));$$

$$b1 = 0.5 * ((1 + gainLin) * a1\_ap + b1\_ap * (1 - gainLin));$$

$$b2 = 0.5 * ((1 + gainLin) * a2\_ap + (1 - gainLin));$$

$$a1 = a1\_ap; \text{ and}$$

$$a2 = a2\_ap.$$

where the ai and bi are the coefficients of the functional filter data set FP[ ] and the ai_ap and bi_ap are the coefficients of the all-pass filter data set.

Figure 4:
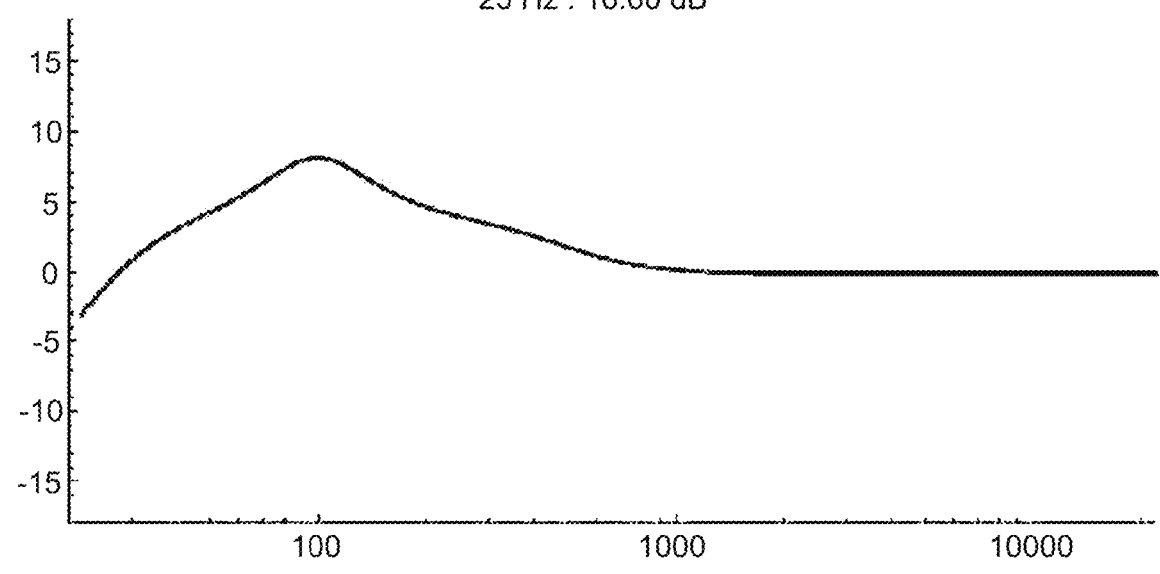
FIG. 4 shows a first example of implementation of the equalisation of FIG. 3.

FIG. 4 shows an example of masking equalisation filter produced when the noise margin is greater than the sum of the speed gain and functional gain.

This example is based on the following data: a speed of 70 km/h corresponding to a speed filter data set having a gain of 3.3 dB, a noise margin of 13 dB, and an engine-noise fundamental frequency of 120 Hz determined from the rpm value of 3600 as the product of the engine speed (rpm) and the number of cylinders divided by 120 (other formulae could be adopted) corresponding to a speed filter data set having a gain of 5 dB.

The function Min( ) of the operation 320 returns a speed gain of 3.3 dB, which means that the speed filter data set of the operation 310 is unchanged. Next, the functional gain is determined by comparing the gain of 5 dB with the value 13−3.3, i.e. 9.7 dB, which means that, there also, the functional filter data set of the operation 340 is unchanged. Because of the nature of the engine noise, the coefficients of the engine filter data set will be related to the harmonics of the fundamental frequency of the engine noise, which is the frequency of 120 Hz explained above.

Finally, the final gain is calculated by subtracting the speed gain and the functional gain from the noise margin, i.e. 13−3.3−5=4.7 dB, which is used as a reference value by the high-pass filter of the operation 380.

Figure 5:
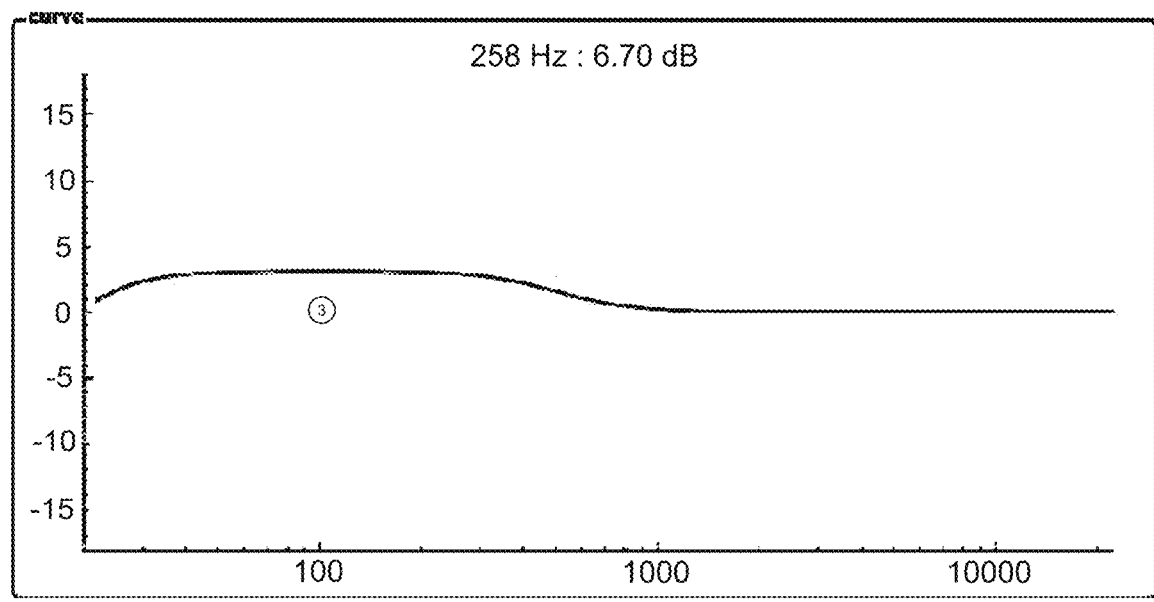
FIG. 5 shows a second example of implementation of the equalisation of FIG. 3.

FIG. 5 shows an example of a masking equalisation filter produced when the noise margin is smaller than the gain of the speed filter data set associated with the speed of the vehicle.

This example is based on the following data: a speed of 105 km/h corresponding to a speed filter data set having a gain of 4 dB, a noise margin of 3.1 dB, and a value of the fundamental frequency of the engine noise of 120 Hz corresponding to a speed filter data set having a gain of 5 dB.

The function Min( ) of the operation 320 returns a speed gain of 3.1 dB, which means that the speed filter data set of the operation 310 must be modified in the operation 330. Unfortunately the operation 330 returns a speed filter data set the speed gain of which is 3.1 dB. Consequently, the functional gain does not have to be calculated since the operation 350 will necessarily return 0 dB (3.1–3.1). The same does not apply to the high-pass filter. In this case, there is no functional filter applied (it is the zero-order filter that is applied).

Figure 6:
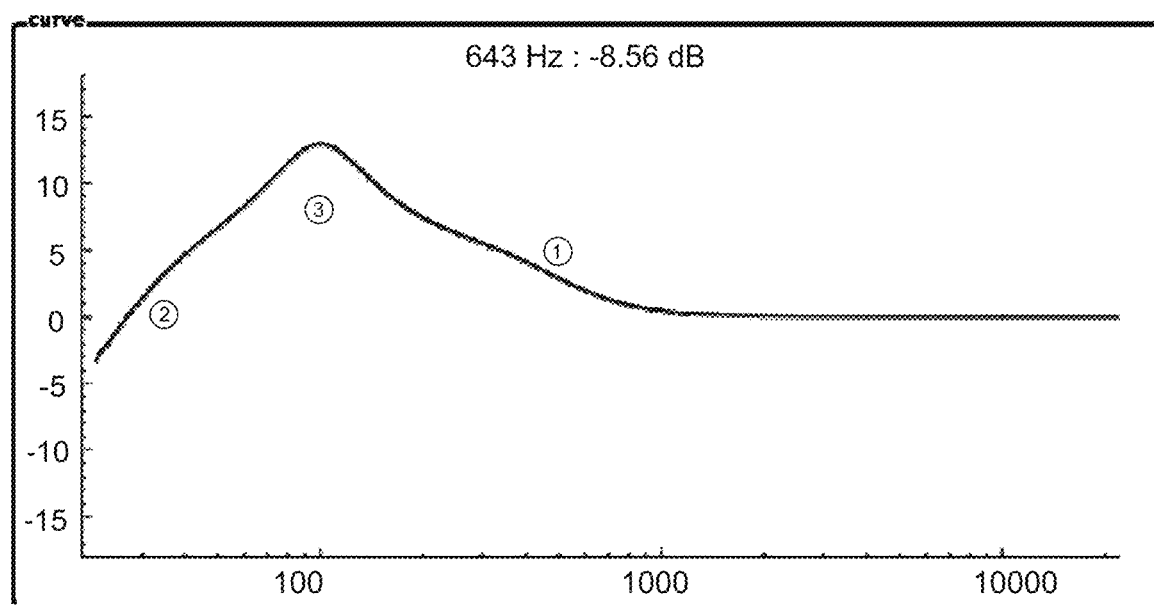
FIG. 6 shows a third example of implementation of the equalisation of FIG. 3.

FIG. 6 shows a third example that relates to the case where the noise margin is greater than the gain of the speed filter data set associated with the speed of the vehicle, but less than the speed gain added to the gain of the functional filter data set associated with the functional parameter.

This example is based on the following data: a speed of 105 km/h corresponding to a speed filter data set having a gain of 4 dB, a noise margin of 3 dB, and a value of the fundamental frequency of the engine noise of 120 Hz corresponding to a speed filter data set having a gain of 5 dB.

The function Min( ) of the operation 320 returns a speed gain of 3 dB, which means that the speed filter data set of the operation 310 must be modified in the operation 330. In this example, the operation 330 returns a speed filter data set the speed gain of which is 2 dB. Consequently, the functional gain will be calculated as follows: Min(5;3–2)=1 dB. The functional filter is determined accordingly in the operation 360, and the zero-order high-pass filter is applied since the noise margin of 3 dB is equal to the sum of the speed gain (2 dB) and functional gain (1 dB).

These examples are arbitrary but make it possible to see how taking the noise margin into account significantly modifies the definition of the masking equalisation filter.

Figure 7:
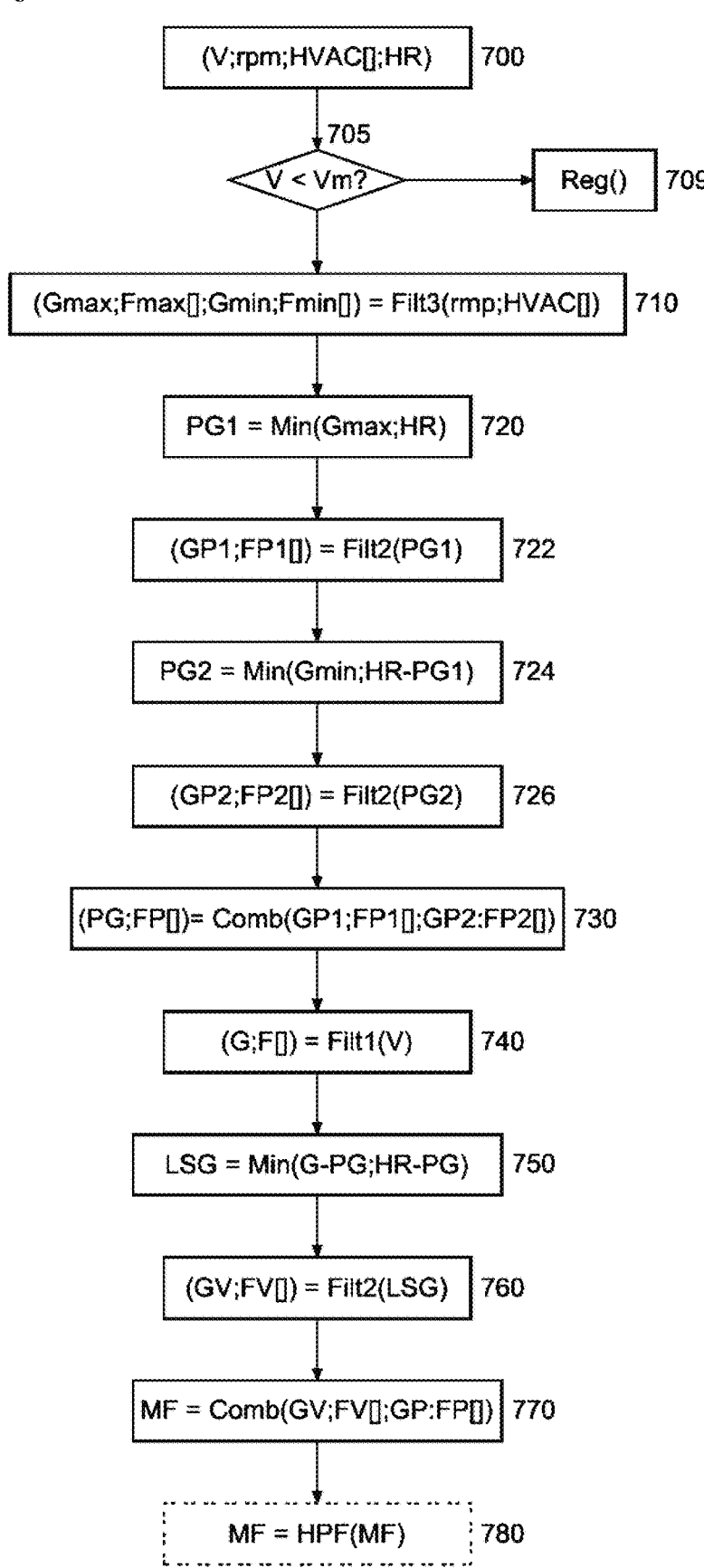
FIG. 7 shows a second embodiment of equalisation by the device of FIG. 2.

FIG. 7 shows an embodiment in a variant that takes account of a subtlety and explains the treatment of the case where a functional speed parameter and a ventilation data functional parameter are present.

In this embodiment, the operations similar to those of FIG. 3 have numerical references the last two figures of which are identical to those of the operations in FIG. 3. Only the differences will be described.

The main difference with this embodiment is that it takes account of a speed threshold to hierarchise the processing of the speed noise with respect to the functional noise. As FIG. 3 shows, as from the noise margin, each processing begins the remaining margin to process the remaining noise.

When the speed is high, the aerodynamic noise is very great and must be prioritised with respect to the functional noise. On the other hand, at low speed, for example below 50 km/h, it can be advantageous to reverse the processing.

Thus, in an operation 705, the speed V is compared with a threshold Vm. If this comparison indicates a high speed, then the processing described with FIG. 3 is implemented (with the addition of the processing of the two functional parameters described below) in an operation 709.

In the contrary case, the functional noise will be processed as a priority. In the embodiment described here, two distinct functional noises are processed: the engine noise and the ventilation noise. To know which to process as a priority, a function Filt3( ) is executed in an operation 710 similar to the operation 310 to recover the engine filter data set corresponding to the rpm functional parameter and the vetilation filter data set corresponding to the ventilation data functional parameter HVAC [ ]. These two sets are classified according to the gain associated therewith, and in an operation 720 and an operation 722 a first functional gain PG1 and its set of coefficients is determined similarly to the operation 320, and a second functional gain PG2 and its set of coefficients is determined taking account of the first functional gain PG1 in operations 724 and 726. Finally, in an operation 730, the functional gain coefficients PG1 and PG2 and their corresponding sets of coefficients are combined in an operation 730. Thus, it is clear that the hierarchical processing by eroding the noise margin is replicated on the functional parameters with a distinct nature.

Next, in operations 740, 750 and 760, the speed gain and the speed filter data set are determined similarly to the operations 340 to 360 (apart from the detail that "functional" and "speed" have reversed roles), then the masking equalisation filter is calculated in an operation 770 and an optional operation 780 applies the high-pass filter.

In the above, the filter data sets are formed by triplets that associate an index value (the speed, the engine speed and the ventilation data) and a gain value associated with coefficients that define together a masking filter. However, the gain value/coefficients pair could be represented by coefficients alone, the gain value being implicitly contained in the norm of the coefficients.

In the light of the above, the Applicant has therefore developed a processing that makes it possible to take account of various types of noise, to recover the information concerning them in a direct source available (the communication bus) and to calculate a masking equalisation filter at very low computing cost. This was unpredictable starting from the SDEC, as proved by the filing of the NDEC patent by the Applicant under the number FR2211921.

Items:

Item 1: Audio-signal equalisation device for a vehicle using a data communication bus, comprising:

a memory (200) arranged to store sets of speed filter data comprising triplets associating a speed value and a gain value associated with coefficients for defining a speed masking filter, and functional filter data sets comprising triplets associating an engine speed value or a ventilation value and a gain value associated with coefficients for defining an engine or ventilation masking filter, a collector (210) arranged to receive at least two parameters accessible on the communication bus, said parameters designating the speed of the vehicle and at least one functional parameter selected from the group comprising the engine speed of the vehicle and a ventilation data set, and a computer (220) arranged to receive as an input a noise margin value, as well as said at least two parameters accessible on the communication bus, to derive therefrom at least one speed filter data set and at least one functional filter data set and to combine them in a masking equalisation filter to be applied to the audio signal.

Item 2: Device according to item 1, wherein the computer (220) is arranged:

to determine a speed filter data set and a functional filter data set in the memory (200) from the at least two parameters determined by the collector (210)

to calculate a speed gain value from at least the gain value of the speed filter data set determined and the noise margin value and to derive therefrom a speed filter data set, and to determine a functional gain value from at least the gain value of the functional filter data set determined, the speed gain value and the noise margin value, and to derive therefrom a functional filter data set.

Item 3: Device according to item 2, wherein the computer (220) is arranged to calculate the speed gain value by retaining the minimum between the gain value of the speed filter data set determined and the noise margin value, and to calculate the functional gain value by selecting the minimum between the gain value of the functional filter data set determined and the difference between the noise margin value and the speed gain value.

Item 4: Device according to item 2 or 3, wherein the computer (220) is arranged, in the presence of an engine speed functional parameter and a ventilation data set functional parameter:

to determine a principal functional filter data set and a second secondary functional filter data set from the engine speed functional parameter and the functional parameter of a ventilation data set, the gain value of the principal functional filter data set being greater than the gain value of the secondary functional filter data set, to determine a first functional gain value from at least the gain value of the principal functional filter data set, the speed gain value and the noise margin value, and to derive therefrom a first functional filter data set, to determine a second functional gain value from at least the gain value of the secondary functional filter data set, the first functional gain value, the speed gain value and from the noise margin value and to derive therefrom a second functional filter data set, and to calculate a functional gain value and a functional filter data set from the first functional gain value, the second functional gain value, the first functional filter data set and the second functional filter data set.

Item 5: Device according to item 1, wherein the computer (220) is arranged, when the speed parameter is below a selected threshold:

to determine a functional filter data set and a speed filter data set in the memory (200) from the at least two parameters determined by the collector (210)

to determine a functional gain value from at least the gain value of the functional filter data set determined and the noise margin value, and to derive therefrom a functional filter data set from the functional gain value, and to determine a speed gain value from at least the gain value of the speed filter data set determined, the functional gain value and the noise margin value, and to derive therefrom a speed filter data set from the speed gain.

Item 6: Device according to item 5, wherein the computer (220) is arranged to calculate the functional gain value by selecting the minimum between the gain value of the functional filter data set determined and the noise margin value, and to calculate the speed gain value by selecting the minimum between the gain value of the speed filter data set determined and the difference between the noise margin value and the functional gain value.

Item 7: Device according to item 5 or 6, wherein the computer (220) is arranged, in the presence of an engine speed functional parameter and a ventilation-data set functional parameter:

to determine a principal functional filter data set and a secondary functional filter data set from the engine speed functional parameter and the functional parameter of a ventilation data set, the gain value of the principal functional filter data set being greater than the gain value of the secondary functional filter data set, to determine a first functional gain value from at least the gain value of the principal functional filter data set and the noise margin value, and to derive therefrom a first functional filter data set, to determine a second functional gain value from at least the gain value of the secondary functional filter data set, the first functional gain value and the noise margin value, and to derive therefrom a second functional filter data set, and to calculate a functional gain value and a functional filter data set from the first functional gain value, the second functional gain value, the first functional filter data set and the second functional filter data set.

Item 8: Device according to one of the preceding items, wherein the computer (220) is arranged to apply a high-pass filter to the masking equalisation filter according to the difference between the noise margin, the speed gain value and the functional gain value.

Item 9: Audio-signal equalisation method for a vehicle using a data communication bus, comprising:

a) storing sets of speed filter data comprising triplets associating a speed value and a gain value associated with coefficients for defining a speed masking filter, and functional filter data sets comprising triplets associating an engine speed value or a ventilation value and a gain value associated with coefficients for defining an engine or ventilation masking filter, b) receiving at least two parameters accessible on the communication bus, said parameters designating the speed of the vehicle and at least one functional parameter selected from the group comprising the engine speed of the vehicle and a ventilation data set, and a noise margin value, and c) deriving, from the parameters of step b) and the noise margin value, at least one speed filter data set and at least one functional filter data set, and to combine them in a masking equalisation filter to be applied to an audio signal.

Item 10: Audio-signal equalisation method according to item 9, wherein the operation c) comprises c1) determining a speed filter data set and a functional filter data set from the at least two parameters determined by the collector (210), c2) calculating a speed gain value from at least the gain value of the speed filter data set determined and the noise margin value, and deriving therefrom a speed filter data set, and c3) determining a functional gain value from at least the gain value of the functional filter data set determined, the speed gain value and the noise margin value, and deriving therefrom a functional filter data set.

Item 11: Audio-signal equalisation method according to item 10, wherein operation c2) comprises calculating the speed gain value by selecting the minimum between the gain value of the speed filter data set determined, the noise margin value, and operation c3) comprises calculating the functional gain value by selecting the minimum between the gain value of the functional filter data set determined, the difference between the noise margin value and the speed gain value.

Item 12: Audio-signal equalisation method according to item 10 or 11, wherein, when operation b) returns an engine speed functional parameter and a ventilation data set functional parameter, operation c3) comprises:

c3a) determining a principal functional filter data set and a second secondary functional filter data set from the engine speed functional parameter and the ventilation data set functional parameter, the gain value of the principal functional filter data set being greater than the gain value of the secondary functional filter data set, c3b) determining a first functional gain value from at least the gain value of the principal functional filter data set, the speed gain value and the noise margin value, and deriving therefrom a first functional filter data set, c3c) determining a second functional gain value from at least the gain value of the secondary functional filter data set, the first functional gain value, the speed gain value and the noise margin value, and deriving therefrom a second functional filter data set, and c3d) calculating a functional gain value and a functional filter data set from the first functional gain value, the second functional gain value, the first functional filter data set and the second functional filter data set.

Item 13: Audio-signal equalisation method according to item 9, wherein, when the speed parameter of operation b) is below a selected threshold, operation c) comprises:

c1) determining a functional filter data set and a speed filter data set in the memory (200) from the at least two parameters determined by the collector (210), c2) determining a functional gain value from at least the gain value of the functional filter data set determined and the noise margin value, and deriving therefrom a functional filter data set from the functional gain value, and c3) determining a speed gain value from at least the gain value of the speed filter data set determined, the functional gain value and the noise margin value, and deriving therefrom a speed filter data set from the speed gain.

Item 14: Audio-signal equalisation method according to item 13, wherein operation c1) comprises calculating the functional gain value by selecting the minimum between the gain value of the functional filter data set determined, the noise margin value, and operation c2) comprises calculating the speed gain value by selecting the minimum between the gain value of the speed filter data set determined, the difference between the noise margin value and the functional gain value.

Item 15: Audio-signal equalisation method according to item 13 or 14, wherein, when operation b) returns an engine speed functional parameter and a ventilation data set functional parameter, operation c2) comprises:

c2a) determining a principal functional filter data set and a secondary functional filter data set from the engine speed functional parameter and the functional parameter of a ventilation data set, the gain value of the principal functional filter data set being greater than the gain value of the secondary functional filter data set, c2b) determining a first functional gain value from at least the gain value of the principal functional filter data set and the noise margin value, and deriving therefrom a first functional filter data set, c2c) determining a second functional gain value from at least the gain value of the secondary functional filter data set, the first functional gain value and the noise margin value, and deriving therefrom a second functional filter data set, and c2d) calculating a functional gain value and a functional filter data set from the first functional gain value, the second functional gain value, the first functional filter data set and the second functional filter data set.

Item 16: Audio-signal equalisation method according to one of items 9 to 15, furthermore comprising the operation d) of applying a high-pass filter to the masking equalisation function according to the difference between the noise margin, the speed gain value and the functional gain value.

Item 17: Computer programme used by a computer comprising instructions for executing the method according to one of items 9 to 16.

Item 18: Data storage medium on which the computer program according to item 17 is recorded.

The invention claimed is:

1. An audio-signal equalisation device for a vehicle using a data communication bus, comprising:

a memory configured to store at least one speed filter data set comprising at least one triple associating a speed value and a gain value associated with coefficients for defining a speed masking filter, and at least one functional filter data set comprising at least one triplet associating an engine speed value or a ventilation value and a gain value associated with coefficients for defining an engine or ventilation masking filter, a collector configured to receive at least two parameters accessible on the communication bus, said parameters designating the speed of the vehicle and at least one functional parameter selected from the group comprising the engine speed of the vehicle and a ventilation data set, and a computer configured to receive as an input a noise margin value, as well as said at least two parameters accessible on the communication bus, to derive therefrom the at least one speed filter data set and the at least one functional filter data set and to combine the at least one speed filter data set and the at least one functional filter data set in a masking equalisation filter to be applied to the audio signal.

2. The audio signal equalisation device according to claim 1, wherein the computer is configured:

to determine at least one speed filter data set and the at least one functional filter data set in the memory from the at least two parameters received by the collector, to calculate a speed gain value from at least the gain value of the at least one speed filter data set determined and the noise margin value and to derive therefrom the at least one speed filter data set, and to determine a functional gain value from at least the gain value of the at least one functional filter data set determined, the speed gain value and the noise margin value, and to derive therefrom the at least one functional filter data set.

3. The audio-signal equalisation device according to claim 2, wherein the computer is configured to calculate the speed gain value by retaining the minimum between the gain value of the at least one speed filter data set determined and the noise margin value, and to calculate the functional gain value by selecting the minimum between the gain value of the at least one functional filter data set determined and a difference between the noise margin value and the speed gain value.

4. The audio-signal equalisation device according to claim 2, wherein the computer is configured, in the presence of an engine speed functional parameter and a ventilation data set functional parameter:

to determine a principal functional filter data set and a second secondary functional filter data set from the engine speed functional parameter and the functional parameter of a ventilation data set, a gain value of the principal functional filter data set being greater than a gain value of the secondary functional filter data set, to determine a first functional gain value from at least the gain value of the principal functional filter data set, the speed gain value and the noise margin value, and to derive therefrom a first functional filter data set, to determine a second functional gain value from at least the gain value of the secondary functional filter data set, the first functional gain value, the speed gain value and from the noise margin value and to derive therefrom a second functional filter data set, and to calculate a functional gain value and a functional filter data set from the first functional gain value, the second functional gain value, the first functional filter data set and the second functional filter data set.

5. The audio-signal equalisation device according to claim 2, wherein the computer is configured to apply a high-pass filter to the masking equalisation filter according to a difference between the noise margin, the speed gain value and the functional gain value.

6. The audio-signal equalisation device according to claim 1, wherein the computer is configured, when the speed parameter is below a selected threshold:

to derive the at least one functional filter data set and the at least one speed filter data set in the memory from the at least two parameters received by the collector, to determine a functional gain value from at least the gain value of the at least one functional filter data set determined and the noise margin value, and to derive therefrom the at least one functional filter data set from the functional gain value, and to determine a speed gain value from at least the gain value of the at least one speed filter data set determined, the functional gain value and the noise margin value, and to derive therefrom the at least one speed filter data set from the speed gain.

7. The audio-signal equalisation device according to claim 6, wherein the computer is configured to calculate the functional gain value by selecting the minimum between the gain value of the at least one functional filter data set determined and the noise margin value, and to calculate the speed gain value by selecting the minimum between the gain value of the at least one speed filter data set determined and a difference between the noise margin value and the functional gain value.

8. The audio-signal equalisation device according to claim 6, wherein the computer is configured, in the presence of an engine speed functional parameter and a ventilation-data set functional parameter:

to determine a principal functional filter data set and a secondary functional filter data set from the engine speed functional parameter and the functional parameter of a ventilation data set, a gain value of the principal functional filter data set being greater than a gain value of the secondary functional filter data set, to determine a first functional gain value from at least the gain value of the principal functional filter data set and the noise margin value, and to derive therefrom a first functional filter data set, to determine a second functional gain value from at least the gain value of the secondary functional filter data set, the first functional gain value and the noise margin value, and to derive therefrom a second functional filter data set, and to calculate a functional gain value and a functional filter data set from the first functional gain value, the second functional gain value, the first functional filter data set and the second functional filter data set.

9. The audio-signal equalisation device according to claim 6, wherein the computer is configured to apply a high-pass filter to the masking equalisation filter according to a difference between the noise margin, the speed gain value and the functional gain value.

10. An audio-signal equalisation method for a vehicle using a data communication bus, comprising:

a) storing at least one speed filter data set comprising at least one triplet associating a speed value and a gain value associated with coefficients for defining a speed masking filter, and least one functional filter data set comprising at least one triplet associating an engine speed value or a ventilation value and a gain value associated with coefficients for defining an engine or ventilation masking filter, b) receiving at least two parameters accessible on the communication bus, said parameters designating the speed of the vehicle and at least one functional parameter selected from the group comprising the engine speed of the vehicle and a ventilation data set, and a noise margin value, and c) deriving, from the parameters of step b) and the noise margin value, the at least one speed filter data set and the at least one functional filter data set, and combining the at least one speed filter data set and the at least one functional filter data set in a masking equalisation filter to be applied to an audio signal.

11. The audio-signal equalisation method according to claim 10, wherein c) comprises:

c1) determining the at least one speed filter data set and the at least one functional filter data set from the at least two received parameters, c2) calculating a speed gain value from at least the gain value of the at least one speed filter data set determined and the noise margin value, and deriving therefrom the at least one speed filter data set, and c3) determining a functional gain value from at least the gain value of the at least one functional filter data set determined, the speed gain value and the noise margin value, and deriving therefrom the at least one functional filter data set.

12. The audio-signal equalisation method according to claim 11, wherein c2) comprises calculating the speed gain value by selecting the minimum between the gain value of the at least one speed filter data set determined, the noise margin value, and c3) comprises calculating the functional gain value by selecting the minimum between the gain value of the at least one functional filter data set determined, a difference between the noise margin value and the speed gain value.

13. The audio-signal equalisation method according to claim 11, wherein, when b) returns an engine speed functional parameter and a ventilation data set functional parameter, c3) comprises:

c3a) determining a principal functional filter data set and a second secondary functional filter data set from the engine speed functional parameter and the ventilation data set functional parameter, a gain value of the principal functional filter data set being greater than a gain value of the secondary functional filter data set, c3b) determining a first functional gain value from at least the gain value of the principal functional filter data set, the speed gain value and the noise margin value, and deriving therefrom a first functional filter data set, c3c) determining a second functional gain value from at least the gain value of the secondary functional filter data set, the first functional gain value, the speed gain value and the noise margin value, and deriving therefrom a second functional filter data set, and c3d) calculating a functional gain value and a functional filter data set from the first functional gain value, the second functional gain value, the first functional filter data set and the second functional filter data set.

14. The audio-signal equalisation method according to claim 11, further comprising:

d) applying a high-pass filter to the masking equalisation filter according to a difference between the noise margin, the speed gain value and the functional gain value.

15. The audio-signal equalisation method according to claim 10, wherein, when the speed parameter of b) is below a selected threshold, c) comprises:

c1) deriving the at least one functional filter data set and the at least one speed filter data set from the at least two received parameters, c2) determining a functional gain value from at least the gain value of the at least one functional filter data set determined and the noise margin value, and deriving therefrom the at least one functional filter data set from the functional gain value, and c3) determining a speed gain value from at least the gain value of the at least one speed filter data set determined, the functional gain value and the noise margin value, and deriving therefrom the at least one speed filter data set from the speed gain.

16. The audio-signal equalisation method according to claim 15, wherein c1) comprises calculating the functional gain value by selecting the minimum between the gain value of the at least one functional filter data set determined, the noise margin value, and c2) comprises calculating the speed gain value by selecting the minimum between the gain value of the at least one speed filter data set determined, a difference between the noise margin value and the functional gain value.

17. The audio-signal equalisation method according to claim 15, wherein, when b) returns an engine speed functional parameter and a ventilation data set functional parameter, c2) comprises:

c2a) determining a principal functional filter data set and a secondary functional filter data set from the engine speed functional parameter and the functional parameter of a ventilation data set, a gain value of the principal functional filter data set being greater than a gain value of the secondary functional filter data set, c2b) determining a first functional gain value from at least the gain value of the principal functional filter data set and the noise margin value, and deriving therefrom a first functional filter data set, c2c) determining a second functional gain value from at least the gain value of the secondary functional filter data set, the first functional gain value and the noise margin value, and deriving therefrom a second functional filter data set, and c2d) calculating a functional gain value and a functional filter data set from the first functional gain value, the second functional gain value, the first functional filter data set and the second functional filter data set.

18. The audio-signal equalisation method according to claim 15, further comprising:

d) applying a high-pass filter to the masking equalisation filter according to a difference between the noise margin, the speed gain value and the functional gain value.

19. A non-transitory computer-readable medium storing a compute gram including instructions that, when executed by a processor, cause execution of the audio-signal equalisation method according to claim 10.

* * * * *